United States Patent
Kononenko et al.

(10) Patent No.: US 10,891,478 B2
(45) Date of Patent: Jan. 12, 2021

(54) METHOD FOR CORRECTION OF THE EYES IMAGE USING MACHINE LEARNING AND METHOD FOR MACHINE LEARNING

(71) Applicant: AUTONOMOUS NON-PROFIT ORGANIZATION FOR HIGHER EDUCATION SKOLKOVO INSTITUTE OF SCIENCE AND TECHNOLOGY, Moscow (RU)

(72) Inventors: Daniil Sergeyevich Kononenko, Moscow (RU); Victor Sergeyevich Lempitsky, Moscow (RU)

(73) Assignee: Skolkovo Institute Of Science And Technology

( * ) Notice: Subject to any disclaimer, the term of this patent is extended or adjusted under 35 U.S.C. 154(b) by 0 days.

(21) Appl. No.: 15/567,365

(22) PCT Filed: Mar. 3, 2016

(86) PCT No.: PCT/RU2016/000118
§ 371 (c)(1),
(2) Date: Oct. 17, 2017

(87) PCT Pub. No.: WO2016/153389
PCT Pub. Date: Sep. 29, 2016

(65) Prior Publication Data
US 2018/0137334 A1    May 17, 2018

(30) Foreign Application Priority Data
Mar. 20, 2015    (RU) ................................ 2015109868

(51) Int. Cl.
*G06K 9/00* (2006.01)
*G06N 20/00* (2019.01)
(Continued)

(52) U.S. Cl.
CPC ....... *G06K 9/0061* (2013.01); *G06K 9/00604* (2013.01); *G06N 5/003* (2013.01);
(Continued)

(58) Field of Classification Search
None
See application file for complete search history.

(56) References Cited

U.S. PATENT DOCUMENTS

| 6,283,858 B1 | 9/2001 | Hayes, Jr. et al. |
| 8,942,434 B1 | 1/2015 | Karakotsios et al. |

(Continued)

FOREIGN PATENT DOCUMENTS

| JP | 2007109255 A | 4/2007 |
| JP | 2007273288 A | 10/2007 |

(Continued)

OTHER PUBLICATIONS

PCT/RU2016/000118 International search report and written opinion of international searching authority dated Aug. 25, 2016. [Non-patent literature document not submitted; previously provided with PTO/SB/08a filed on Jan. 17, 2018.].

(Continued)

*Primary Examiner* — Leon Viet Q Nguyen
(74) *Attorney, Agent, or Firm* — Penny L. Lowry

(57) ABSTRACT

The present invention refers to automatics and computing technology, namely to the field of processing images and video data, namely to correction the eyes image of interlocutors in course of video chats, video conferences with the purpose of gaze redirection. A method of correction of the image of eyes wherein the method obtains, at least, one frame with a face of a person, whereupon determines positions of eyes of the person in the image and forms two rectangular areas closely circumscribing the eyes, and finally replaces color components of each pixel in the eye (Continued)

areas for color components of a pixel shifted according to prediction of the predictor of machine learning. Technical effect of the present invention is rising of correction accuracy of the image of eyes with the purpose of gaze redirection, with decrease of resources required for the process of handling a video image.

13 Claims, 4 Drawing Sheets

(51) Int. Cl.
G06T 11/60 (2006.01)
G06N 5/00 (2006.01)
G06N 20/20 (2019.01)
G06T 7/70 (2017.01)
G06N 3/04 (2006.01)

(52) U.S. Cl.
CPC ............. *G06N 20/00* (2019.01); *G06N 20/20* (2019.01); *G06T 7/70* (2017.01); *G06T 11/60* (2013.01); *G06N 3/04* (2013.01)

(56) References Cited

U.S. PATENT DOCUMENTS

| | | | |
|---|---|---|---|
| 9,224,060 B1 | 12/2015 | Ramaswamy | |
| 9,224,248 B2 | 12/2015 | Ye et al. | |
| 9,378,574 B2 | 6/2016 | Kim et al. | |
| 9,740,282 B1 | 8/2017 | McInerny | |
| 9,872,007 B2 | 1/2018 | Woodgate et al. | |
| 9,986,812 B2 | 6/2018 | Yamanashi et al. | |
| 2002/0013691 A1 | 1/2002 | Warnes | |
| 2003/0197779 A1 | 10/2003 | Zhang et al. | |
| 2003/0218672 A1 | 11/2003 | Zhang et al. | |
| 2005/0053274 A1 | 3/2005 | Mayer et al. | |
| 2005/0104878 A1 | 5/2005 | Kaye et al. | |
| 2007/0019882 A1 | 1/2007 | Tanaka et al. | |
| 2007/0244606 A1 | 10/2007 | Zhang et al. | |
| 2011/0063465 A1 | 3/2011 | Nanu et al. | |
| 2011/0199460 A1 | 8/2011 | Gallagher | |
| 2012/0105486 A1* | 5/2012 | Lankford | G06F 3/013 345/661 |
| 2012/0114201 A1 | 5/2012 | Luisi et al. | |
| 2012/0219180 A1 | 8/2012 | Mehra | |
| 2012/0223956 A1 | 9/2012 | Saito et al. | |
| 2012/0236133 A1 | 9/2012 | Gallagher | |
| 2012/0319928 A1 | 12/2012 | Rhodes | |
| 2013/0070046 A1* | 3/2013 | Wolf | H04N 7/144 348/14.16 |
| 2013/0076853 A1 | 3/2013 | Diao | |
| 2013/0163659 A1 | 6/2013 | Sites | |
| 2014/0002586 A1 | 1/2014 | Nourbakhsh | |
| 2014/0016871 A1* | 1/2014 | Son | G06K 9/46 382/201 |
| 2014/0267584 A1 | 9/2014 | Atzpadin et al. | |
| 2015/0077526 A1 | 3/2015 | Kim et al. | |
| 2015/0269737 A1 | 9/2015 | Lam et al. | |
| 2015/0339512 A1 | 11/2015 | Son et al. | |
| 2016/0125227 A1 | 5/2016 | Soare et al. | |
| 2016/0196465 A1* | 7/2016 | Wu | G06K 9/0061 382/203 |
| 2016/0219258 A1 | 7/2016 | Woodgate et al. | |
| 2017/0134720 A1 | 5/2017 | Park et al. | |
| 2017/0195662 A1 | 7/2017 | Sommerlade et al. | |
| 2017/0364149 A1* | 12/2017 | Lu | G06F 3/013 |
| 2018/0035886 A1* | 2/2018 | Courtemanche | A61B 5/16 |

FOREIGN PATENT DOCUMENTS

| | | |
|---|---|---|
| WO | 2011148366 A1 | 12/2011 |
| WO | 2016132148 A1 | 8/2016 |

OTHER PUBLICATIONS

Yip, "Face and Eye Rectification in Video Conference Using Artificial Neural Network", IEEE International Conference on Multimedia and Expo, 2005. ICME 2005. Amsterdam, The Netherlands, Jul. 6-8, 2005, IEEE, Piscataway, NJ, USA, Jul. 6, 2005 (Jul. 6, 2005), pp. 690-693,XP010844250,DOI: 10.1109/ICME.2005. 1521517ISBN: 978-0-7803-9331-8 the whole document.
PCT/RU2016/000118 International search report and written opinion of international searching authority dated Aug. 25, 2016.
PCT/RU2016/000118 International Preliminary Report on Patentability dated Sep. 26, 2017.
Kononenko, et al., "Learning to Look Up: Realtime Monocular Gaze Correction Using Machine Learning", Computer Vision and Pattern recognition, pp. 4667-4675, 2015.
Ganin, et al., "DeepWarp: Photorealistic Image Resynthesis for Gaze Manipulation", Jul. 25, 2016 (Jul. 25, 2016), XP055295123,Retrieved from the Internet: URL:http://arxiv.org/pdf/1607.07215v2.pdf [retrieved on Jan. 10, 2018].
Giger, et al., "Gaze Correction with a Single Webcam", published in: Proceedings of IEEE ICME 2014 (Chengdu, China, Jul. 14-18, 2014).
Xiong, et al., "Supervised descent method and its applications to face alignment", In Computer Vision Pattern Recognition (CVPR), 2013 IEEE Conference on, pp. 532-539. IEEE, 2013.
Smith, et al., Gaze locking: passive eye contact detection for human-object interaction. In Proceedings of the 26th annual ACM symposium on User interface software and technology, pp. 271-280. ACM, 2013.
Ren, et al., Face alignment at 3000 fps via regressing local binary features. In CVPR, pp. 1685-1692, 2014.
Cootes et al., "Active Appearance Models", IEEE Trans. Pattern Analysis and Machine Intelligence, 23(6):681-685, 2001.
Cootes et al., "Active Shape Models—Their Training and Application" Computer Vision and Image Understanding 61(1):38-59 Jan. 1995.
Dalal et al., "Histogram of Oriented Gradients for Human Detection", Computer Vision and Pattern Recognition, pp. 886-893, 2005.
Drucker et al., "Support Vector Regression Machines", Advances in Neural Information Processing Systems 9, pp. 155-161, NIPS 1996.
EP-17736268.8 European Extended Search Report of European Patent Office dated Jul. 12, 2019.
Ho, "Random Decision Forests", Proceedings of the 3rd International Conference on Document Analysis and Recognition, Montreal, QC, pp. 278-282, Aug. 14-16, 1995.
International Search Report and Written Opinion dated Apr. 18, 2017 in International Patent Application No. PCT/US17/12203.
International Search Report and Written Opinion dated Oct. 16, 2018 in International Patent Application No. PCT/US18/45648.
Lowe, "Distinctive Image Features from Scale-Invariant Keypoints", International Journal of Computer Vision 60 (2), pp. 91-110, 2004.
Ozuysal et al., "Fast Keypoint recognition in Ten Lines of Code", Computer Vision and Pattern Recognition, pp. 1-8, 2007.
Saffari et al., "On-line Random Forests", 3rd IEEE ICCV Workshop, On-line Computer Vision, 2009.
Sahoo et al., "Online Deep Learning: Learning Deep Neural Networks on the Fly", School of Information Systems, Singapore Management University (https://arxiv.org/abs/1711.03705), 2017, pp. 1-9.
Viola and Jones, "Rapid Object Detection using a Boosted Cascade of Simple Features", pp. 1-9 CVPR 2001.
Yang, "Mutli-scale recognition with DAG-CNNs", ICCV 2015.
Zach et al., "A Duality Based Approach for Realtime TV-L1 Optical Flow", Pattern Recognition (Proc. DAGM), 2007, pp. 214-223.

\* cited by examiner

METHOD FOR CORRECTION OF THE EYES IMAGE USING MACHINE LEARNING AND METHOD FOR MACHINE LEARNING

TECHNICAL FIELD

This group of inventions refers to automatics and computing technology, in general, to the field of processing images and video data, namely to correction the image of eyes of interlocutors in the course of video chats, video conferences.

BACKGROUND ART

Presently video conferences between business partners and a video call to relatives abroad became an everyday occurrence. Choice of particular software and hardware is hindered by complexity related to lack of visual contact between the parties. This problem attracts researchers and engineers for a long time, and it is caused by the inevitable difference between the position of the camera capturing video image, and the image of a face on the screen.

The most successful presently known solutions require additional equipment, besides the webcam, such as: semi-transparent mirrors/screens, stereocameras or RGB-D cameras.

It is known in the state of art a patent application WO2011148366 <<Method and system for correcting gaze offset>> published on Dec. 1, 2011, applicant Ramot At Tel-Aviv University Ltd. The method comprising following steps: processing the image so as to extract location of at least one eye over the image; processing the image to replace imagery data associated with each location of each eye with replacement data, thereby providing a corrected image; and transmitting said corrected image to a display device. Disadvantage of the given method is, first, necessity to prerecord a set of imagery data with a gaze directed to the camera for each participant of the video conference before its beginning, and, secondly, unnatural fixation of the gaze direction during the video conference.

Also it is known, from the state of art an article <<Gaze Correction with a Single Webcam>> authors; D. Giger, J. C. Bazin, a C. Kuster, T. Popa, M. Gross, published in: Proceedings of IEEE ICME 2014 (Chengdu, China, Jul. 14-18, 2014). The specified method includes: determination of facial feature points and matching a geometrical model of the person head according to the determined facial features, projection of the image to texture of adjusted model, rotating model to a certain angle and projection of the turned model in the image, matching of the model image and the source image. Limitation of the given method are: deformation of global face proportions, necessity to prerecord a texture for shielded parts of the head (for example, chin) and requirement for graphic accelerator to achieve productivity necessary for real time system operation.

SUMMARY OF THE INVENTION

An object of the given group of inventions is correction of the image of eyes of the interlocutor during video conferences using a device including only one means for video recording (videocamera).

Technical effect of the given invention is the increase of the correction accuracy of the image of eyes with the simultaneous decrease of resources required for the process of handling a video frame.

This technical effect is attained due to a method for machine learning a predictor, used for correction of gaze orientation in the images wherein the method first obtains a plurality of pairs of images containing in each pair of images of the same person, whereas the pairs of images differ only by a gaze direction, then determines positions of eyes in each pair of images, next learns the predictor producing adjusting displacement vector field, so that for each pair of images replacement of color components in each pixel of the first image from the pair, for color components of another pixel of the first image of the pair shifted according to the displacement predicted by the predictor, results in an image as much as possible similar to the second image of the pair, and saves the predictor as a result.

A predictor of the displacement fields can take the following forms:
  a single-layer or multilayer neural network.
  at least one decision tree or an ensemble of decision trees,
  a predictor that produces a feed displacement vector depending only on pixel position concerning the feature points of an eye.
  Any other form of predictors known in machine learning
  Eyes area in the pairs of images are brought to a pref-fixed pixel scale.

Predictor is stored in an information medium comprising a hard disk or a solid-state drive, or flash-storage, or an optical disk, or hybrid drives, or a random access memory (RAM), or a remote computer system, or a remote storage of data.

Also the specified technical effect is attained with a method for correction of a position of eyes in an image wherein the method first loads predictor, then obtains, at least, one frame with a face of a person, then determines positions of eyes of the person in the image and forms two rectangular areas closely circumscribing the eyes, and as a result replaces color components of each pixel in the eye areas for color components of a pixel shifted according to prediction of the predictor.

The predictor is trained according the above described criterion (to minimize the difference between the actual and the obtained images for the second image in each training pair).

The predictor is loaded from an information medium which can comprise a hard disk or a solid-state drive, or a flash-storage, or an optical disk, or hybrid drives, or a random access memory (RAM), or a remote computer system, or a remote data storage.

Predictor is a single-layer or a multilayer neural network.

Predictor is at least an one decision tree or an ensemble of decision trees.

After training the predictor applied to each pixel in the eyes area should fulfil the following requirements:
  a. When applied to a pixel, the predictor should produce adjusting displacement vector for the replacement of the color components of the given pixel by color components of another pixel determined by the given displacement vector;
  b. Predictor is trained on plurality of pairs of images where one of the Images m a pair contains an initial image of the persons face before adjustment of the eyes, and the other image contains an image of a person with the eyes gazing in a different direction.

The displacement vector predicted by the predictor is scaled according to the ratio of sizes of eyes in the adjusted image to the training images.

DETAILED DESCRIPTION OF EMBODIMENTS

Concepts and definitions required for the detailed disclosure of the present invention will be described below.

Predictor is a program or hardware implementation for the comparison with samples of given certain objects (for example class labels, scalar or vector values) which depends on a considerable number of the parameters trained by means of machine learning procedure on a training plurality. A decision tree, a neural network, a set of decision trees can be given as examples of predictor architectures. Depending on the predictor, parameters can include, for example, the weights of a neural network, the threshold values in decision trees, etc.

The internal state of a predictor is a set of all parameters value of a predictor that affect its predictions.

Decision trees are a method of representation rules in a hierarchical, consecutive structure where a unique node (a tree leaf) gives a solution for each object.

Color components are three or four values in a tuple of numbers which defines a color model for description of colors representation.

There are many various types of color models, but computer graphics, as a rule, uses the following color spaces: CMY, CMYK, CMYK256, RGB, HSB, HLS, L*a*b, YIQ, Grayscale (Shades of grey).

For example, in the most known color model RGB, the tuple contains three color components. For example: (255, 64, 23) is a color containing a strong red component, a smaller amount of green and even smaller amount of blue.

The given invention can be implemented on a computer in form of a system or on a machine-readable medium containing instructions for execution of the aforementioned method.

Figure 1:
FIG. 1 shows a correction of the image of eyes of an interlocutor in real time. At the left there is an input frame with a gaze directed ten degrees below the camera. In the middle there is an input frame with a gaze directed ten degrees above than in the left frame (in this case, gaze is directed into the camera). The right frame is an instance of effect of the invention in which the gaze direction of the interlocutor in the image is adjusted ten degrees upwards in relation to the input image (shown on the left).
Figure 1:
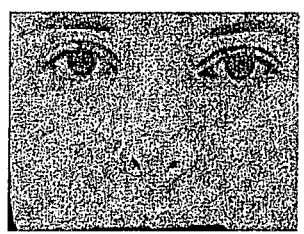
Figure 1:
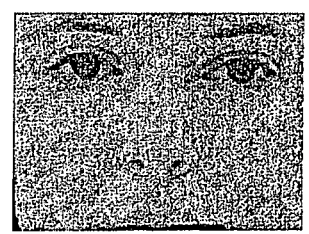
Figure 3:
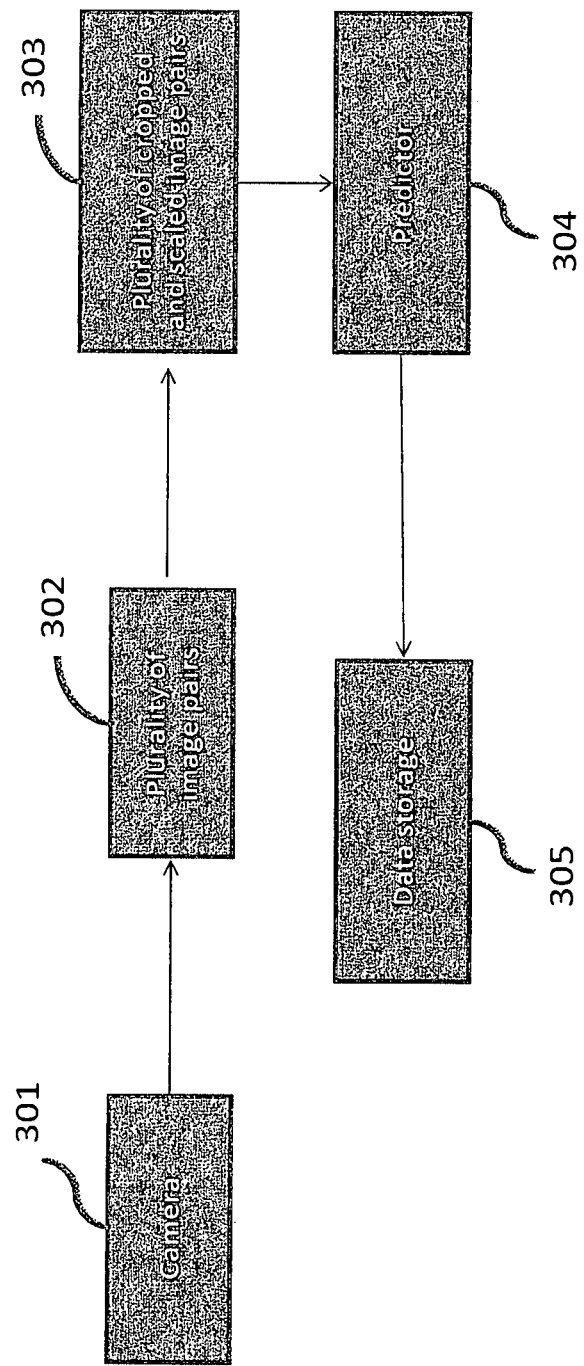
FIG. 3 shows a block diagram of a method for machine learning of the predictor used for the correction of the image of eyes.

Method of machine learning of the predictor used for correction of gaze orientation in the image, including following steps:

Gaining a plurality of pairs of images containing in each pair images of the same person, different only by gaze direction;

Plurality of pairs of images 302 (FIG. 3) arrives from a videocamera 301 (FIG. 3). To provide a possibility of machine learning a predetermined set of pairs of images ($I_j$, $O_j$) is required fulfilling the following requirements: each pair of images represents a face of the same person, in the same position of a head and equal conditions of visualization, differing only by gaze direction of this person (FIG. 1). Difference in gaze direction is equal in all learning pairs. The given difference in gaze direction should be from 5 to 20 degrees for the correct operation of the method.

Defining positions of eyes for each pair of images;

An algorithm of controlled gradient descent, which description can be found in the reference article [1], can be used for the determination of a position of eyes, for example. Also methods can be used based on consecutive application of decision trees. Various alternatives in implementation of the specified methods are described in articles [2] and [3].

Further, images are brought to equal size. For each pair of images matching to the right eye, focusing is made an points $(f_1, g_1), (f_2, g_2) \ldots (f_N, g_N)$, matching to this eye in the image $I^j$. In article [1] number of points N is 6. It is obvious that it is not a fixed parameter. Further, axes-aligned rectangles B' bounding points of each eye are determined, and a characteristic radius $\Delta$ is defined as $\sqrt{\text{Area}(B')}$. Further a rectangle B is considered having a center in the same position, as B', and also width W and height H which are proportional to $\Delta$ (i.e. $W=\alpha *^\Delta$, and $H=\beta *\Delta$ for some constants $\alpha$ and $\beta$). Constants $\alpha$ and $\beta$ are selected arbitrarily in the range from 1 to 20. In the conducted experiments, values $\alpha$ and $\beta$ were 2.0 and 1.6 accordingly. Thus, the rectangle B is convariant to scale and eye position, and has a ratio of sides $\alpha$, $\beta$. Images $I^j$ and $O^j$ are trimmed according to rectangle B and scaled in $R/^\Delta$ times so that characteristic radius of eyes in the images becomes constant. Images for the left eye are treated similarly after regular reflection relative vertical axis. As a result a plurality of trimmed and scaled pairs of images 303 was obtained (FIG. 3).

learning the predictor producing adjusting displacement vector so that for each pair of images replacement of color components in each pixel of the first image form the pair, for color components of another pixel of the first image of the pair shifted according to prediction of the predictor, results in an image as similar as possible to the second image of the pair;

In each pixel (x,y) value $O^j(x,y)$ is replaced with the value $I^j(x,y)$ by means of operation $O(x,y)=I(x+u(x,y),y+v(x,y))$. Thus, each pixel (x,y) within the bounding rectangle B specifies learning of a tuple $S=[(x,y),I,(f_i,g_i),O(x,y)]$, (which includes a (x,y) pixel position, an input image I, points on the outline of eyes $\{f_i,g_i\}$ and the color O(x, y) of pixel in the output image. Then decision trees are learned on the basis of educational tuples (learning samples).

Each learning sample does not include a displacement vector (u(x,y),v(x,y)) and include sonly required color O(x,y) while the same color components can be obtained by means of various offsets.

The image of eyes is adjusted by the application a machine-trained predictor 304 (FIG. 3) in each pixel in the eyes area, and predictor P is determined by the following two properties:

(1) At handling pixel by a predictor P a displacement vector is predicted, which is used according to the correction procedure to replace the intensity (color components) of this pixel with intensity (color components) of the shifted pixel.

(2) During training, for the plurality of pairs of images (im1, im2), the applicaiton of P should lead to the conversion of im1 into im2, where im1 contains an input image and im2 contains the required image.

saving the predictor;

Depending on the type of the predictor (a decision tree, a set of decision trees, a neural network) the parameters of the given predictor are stored in an information medium 305 (FIG. 3) which is a hard disk or a solid-state drive, or an optical drive, or a flash-storage. Also a predictor can be saved in a random access memory (RAM).

For example, if a decision tree is used as a predictor the parameters can be: characteristics of tests, threshold values τ, connections between the nodes, number of leaves, depth of a tree, values of nodes, a full topology of the tree.

Method of correction an eye image comprises:

loading a predictor;

Depending on a predictor 404 type (FIG. 4) (a decision tree, a set of decision trees, a neural web), parameters of the given predictor are loaded from an information medium 403 (FIG. 4) which can be a hard disk or a solid-state drive, or an optical drive, or a flash-storage. Also predictor can be loaded from a random access memory (RAM).

For example, if a decision tree is used as a predictor the parameters can be: characteristics of tests, threshold values τ, connections between the nodes, number of leaves, depth of a tree, values of nodes, a full topology of the tree.

obtaining at least one frame of a person's face;

Images can be transmitted in form of stream video arriving from a source of video data 401 (FIG. 4) in real time or from a storage, from a local video server or a central server. For transmission of the stream video standard protocols RTSP (RealTimeStreamingProtocol), RTMP (RealTimeMessagingProtocol), HLS (HTTPLiveStreaming) and DASH (DynamicAdaptiveStreamingover HTTP) can be used. Thus speed and quality of transmitted video data can automatically adapt for a device communications channel.

Video data can be transmitted in compressed form, for example, by means of coders H.264, VP8, MJPEG, JPEG, JPEG2000.

Video data can be transmitted in the form of separate files. Thus standard containers, for example, WebM, OGV, MKV, MP4, TS, JPG and others can be used.

Figure 4:
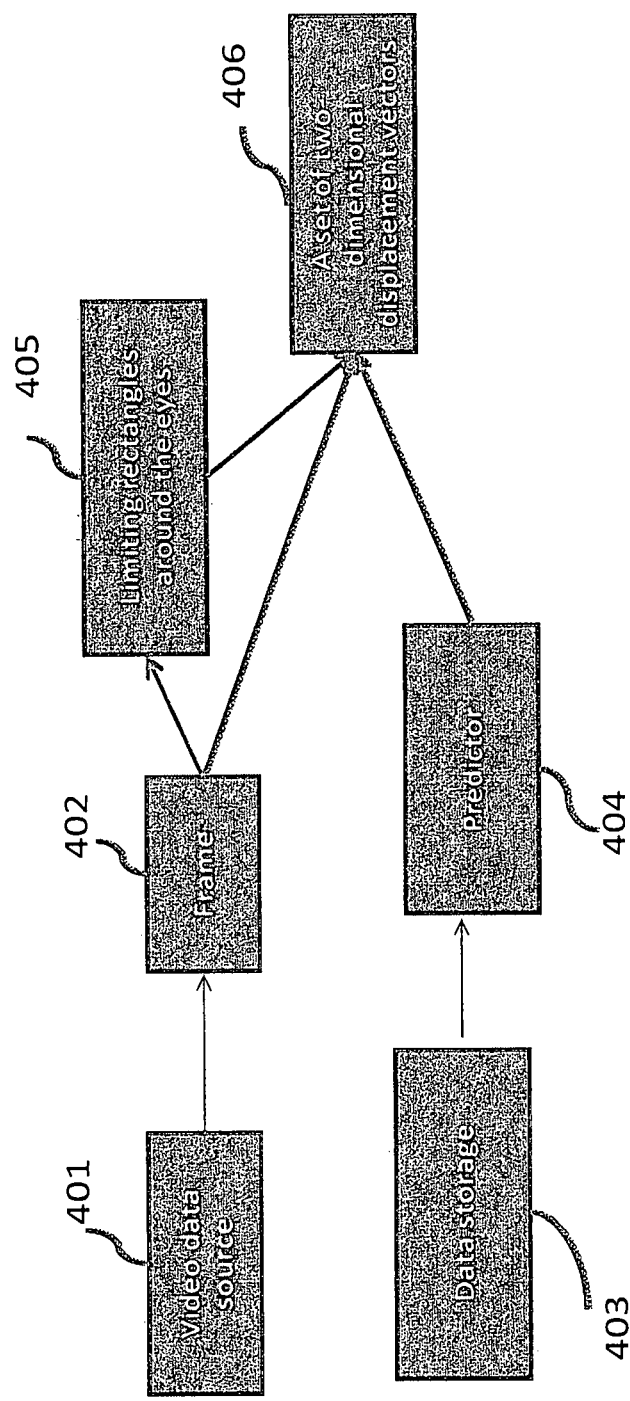
FIG. 4 shows a block diagram of a method for correction of the image of eyes.

Video data can be transmitted on wireless webs, such as GSM (Global System for Mobile Communications), CDMA (Code division multiple access), LTE (Long Term Evolution), Wi-Fi (Wireless Fidelity). In some implementations of the present invention obtaining and/or sending data is carried out with usage of the several technologies described above or reception/transmission technologies.

defining positions of person's eyes in the image and two rectangular areas closely circumscribing the eyes;

Each eye focuses on points $(f_1, g_1), (f_2, g_2) \ldots (f_N, g_N)$, matching this eye which are allocate don an eye outline. Further, axes aligned rectangles bounding B' points of each eye are determined, and a characteristic radius Δ is defined as $\sqrt{Area(B')}$. Further considered is a rectangle B having a center in the same position, as B', and also width W and height H which are proportional Δ (i.e. $W=\alpha*\Delta$, and $H=\beta*\Delta$ for some constants α and β). Thus, the rectangle B is convariant to scale and eye position, and has a ratio of sides α:β.

replacing color components of each pixel in the eyes area with color components of the pixel shifted according to the prediction of the predictor;

After determining bounding rectangles 405 (FIG. 4) around the eyes, color components of pixels are changed for the redirection of the gaze. The given step of the method is fulfilled by means of machine learning by the usage of the predictor 404 (FIG. 4). As a result of matchingpixels in rectangles of input images and images in a learning set, a two-dimensional (2-D) displacement vector (u(x,y),v(x,y)) is obtained at (x,y) pixel coordinates. The final value of pixels O(x,y) in the output image is computed by the formula O(x,y)=I(x+u(x,y),y+v(x,y)). Thus, a set of two-dimensional vectors of offsets 406 (FIG. 4) is obtained for each pixel of a bounding rectangle 405 (FIG. 4)) around the eyes.

Figure 2:
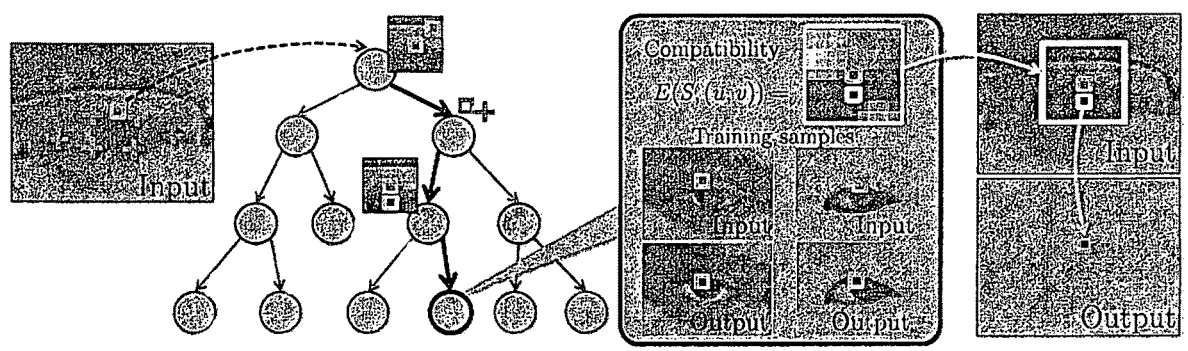
FIG. 2 shows a pixel handling in case the predictor is a decision tree.

In more details (FIG. 2), a predictor in this case a decision tree) matches each pixel (x,y) to the learning data and thus determines the offset. As a pixel is passed through the given tree, it is sequentially subjected to two types of tests. In each non-leaf node of the randomized decision tree a type of test which is applied to pixel is determined. The test of the first type (an appearance test) is determined by an offset (dx,dy) in one of the channels {R; G; B} and a threshold value τ, and within the frames of this test a difference of two values of pixels in this color channel is compared to the threshold value as follows:

$$I(x+dx, y+dy)[c] - I(x, y)[c] \genfrac{}{}{0pt}{}{>}{<} \tau.$$

The test of the second type (the test for position of pixel with respect to the feature point) is determined by the number of the feature point $i \in \{1, \ldots N\}$ and the threshold value τ, and within the frames of this test either $x-f_i$ or $y-g_i$ is compared to threshold value τ as follows:

$$x - f_i \genfrac{}{}{0pt}{}{>}{<} \tau \text{ or } y - g_i \genfrac{}{}{0pt}{}{>}{<} \tau.$$

Each of the leaves contains unnormalized offset error distribution which are references as compatibility maps. In each pixel of a compatibility card there is a summarized difference between true color components of the pixel in the output image and color components of the pixel in the input image, shifted on (u, v). If this difference is small enough, it is possible to approach the pixel in the output image by the pixel in the input image after shift on (u, v).

Total number of the applied tests depends on depth of the decision tree, and the type of the presently applied test depends on the node type in which we are present at the moment.

In order to increase the accuracy of correction a set of several independently learned decision trees can be applied. For a given pixel, each tree predicts a compatibility map (recorded in the corresponding leaf of the tree). The compatibility maps from different trees are then summed together, which allows to estimate the compatibility map typical for the given type of pixels more accurately. For the aggregated compatibility map, the most compatible shift for the given type of pixels is selected (as a position of the minimum on the map). This value (u, v) is used for conducting operation on recovery O(x,y)=I(x,+u(x,y)y+v(x,y).

The present detailed specification is composed with presenting various embodiments having no limitative and exhaustive character. At the same time, for a person skilled in the art it is obvious that various replacements, modifications or combinations of any embodiments disclosed here (also partially) can be reproduced within the scope of the present invention. Thus, it is meant and it is clear that the present specification of the invention includes additional alternatives of the embodiments which essence is not stated here in explicitly expressed form. Such embodiments can be obtained in result of, for example, combinations, modifications or conversions of any actions, components, devices, properties, aspects, performances, restrictions and so forth, referring to the given here and not having limitative character embodiments.

REFERENCES

1. X. Xiong and F. De la Torre, Supervised descent method and its applications to face alignment. In Computer Vision and Pattern Recognition (CVPR), 2013 IEEE Conference on, pages 532-539. IEEE, 2013.
2. B. A. Smith, Q. Yin, S. K, Feiner, and S. K. Nayar. Gaze locking: passive eye contact detection for human-object interaction. In Proceedings of the 26th annual ACM symposium on User interface software and technology, pages 271-280. ACM, 2013.
3. S. Ren, X. Can, Y. Wei, and J. S. 0001. Face alignment at 3000 fps via regressing local binary features. In CVPR, pages 1685-1692, 2014.

The invention claimed is:

1. A method for machine learning of a predictor, used for the correction of gaze orientation in an image, the method comprising:
    obtaining a plurality of predetermined pairs of images containing views of a same person, the predetermined pairs of images differing by a gaze direction, and wherein, for all predetermined pairs of images, the difference in gaze direction in each image in the learning pair is equal;
    determining positions of eyes in each of the predetermined pair of images;
    determining a predictor for producing adjusting displacement vector fields for each predetermined pair of images by replacing color components of each pixel of the first image from the pair with color components of another pixel of the first image of the pair according to a prediction of the predictor, resulting in an image similar to the second image of the pair; and
    saving the predictor in an information medium.

2. The method of claim 1 wherein the predictor is a single-layer or multilayer neural network.

3. The method of claim 1 wherein the predictor is at least one decision tree or an ensemble of decision trees.

4. The method of claim 1 wherein the predictor produces a fixed displacement vector depending only on pixel position concerning a plurality of characteristic points of an eye.

5. The method of claim 1 wherein an eyes area in the learning pairs of images are brought to a preset pixel scale.

6. The method of claim 1 wherein the information medium on which the predictor is stored comprises a hard disk, a solid-state drive, flash-storage, an optical disk, hybrid drives, random access memory (RAM), a remote computer system, or a remote storage of data.

7. A method for machine learning of a predictor, the predictor being used for the correction of gaze orientation in an image, the method comprising:
    loading a predictor that is based on a plurality of predetermined pairs of images containing views of the same person, the predetermined pairs of images differing by a gaze direction;
    obtaining, at least, one frame with a face of a person;
    determining positions of eyes of the person in the image and forming two rectangular areas closely circumscribing the eyes; and
    replacing color components of each pixel in the eye areas with color components of a pixel according to a prediction of the predictor based on machine learning.

8. The method of claim 7 wherein the predictor is further configured for:
    determining positions of eyes in each of the predetermined pair of images;
    determining the predictor for producing adjusting displacement vector fields for each learning pair of images by replacing color components of each pixel of the first image from the pair with color components of another pixel of the first image of the pair according to the prediction of the predictor, resulting in an image similar to the second image of the pair; and
    saving the predictor in an information medium.

9. The method of claim 7 wherein the predictor is loaded from an information medium comprising a hard disk or a solid-state drive, or a flash-storage, or an optical disk, or hybrid drives, or a random access memory (RAM), or a remote computer system, or a remote data storage.

10. The method of claim 7 wherein the predictor is a single-layer or a multilayer neural network.

11. The method of claim 7 wherein the predictor is at least one decision tree or an ensemble of decision trees.

12. The method of claim 7 wherein the predictor applied to each pixel in the eyes area fulfils the following:
    applied to a pixel predictor should produce adjusting displacement vector for the replacement of the color components of the given pixel by color components of the replacing pixel determined by the given displacement vector;
    predictor was trained on plurality of pairs of images where one of the images in a pair contains an initial image of the persons face before adjustment of position of the eyes, and the other image contains an image of a person with a desirable position of eyes.

13. The method of claim 12 wherein the displacement vector predicted by the predictor is scaled according to a ratio of sizes of eyes in the adjusted image to a training sample.

* * * * *